Oct. 1, 1968  J. BOYCE ET AL  3,403,770
ARTICLE ORIENTING APPARATUS
Filed Jan. 5, 1967  3 Sheets-Sheet 1
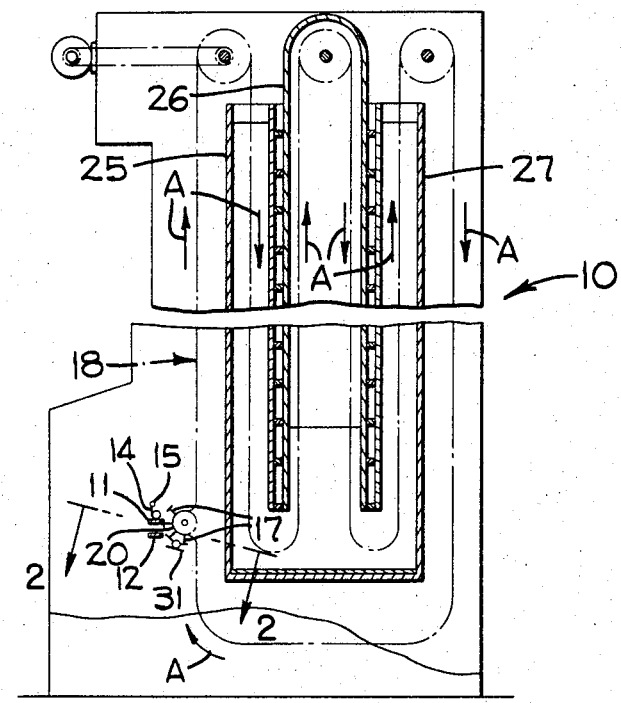
FIG_1
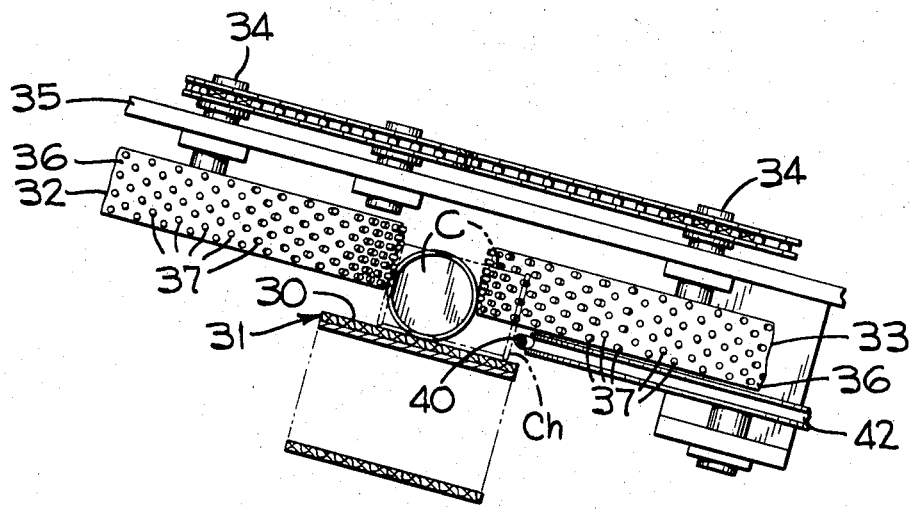
FIG_3
INVENTORS.
JOHN BOYCE
SHERMAN H. CREED
BY
Francis W. Anderson
ATTORNEY

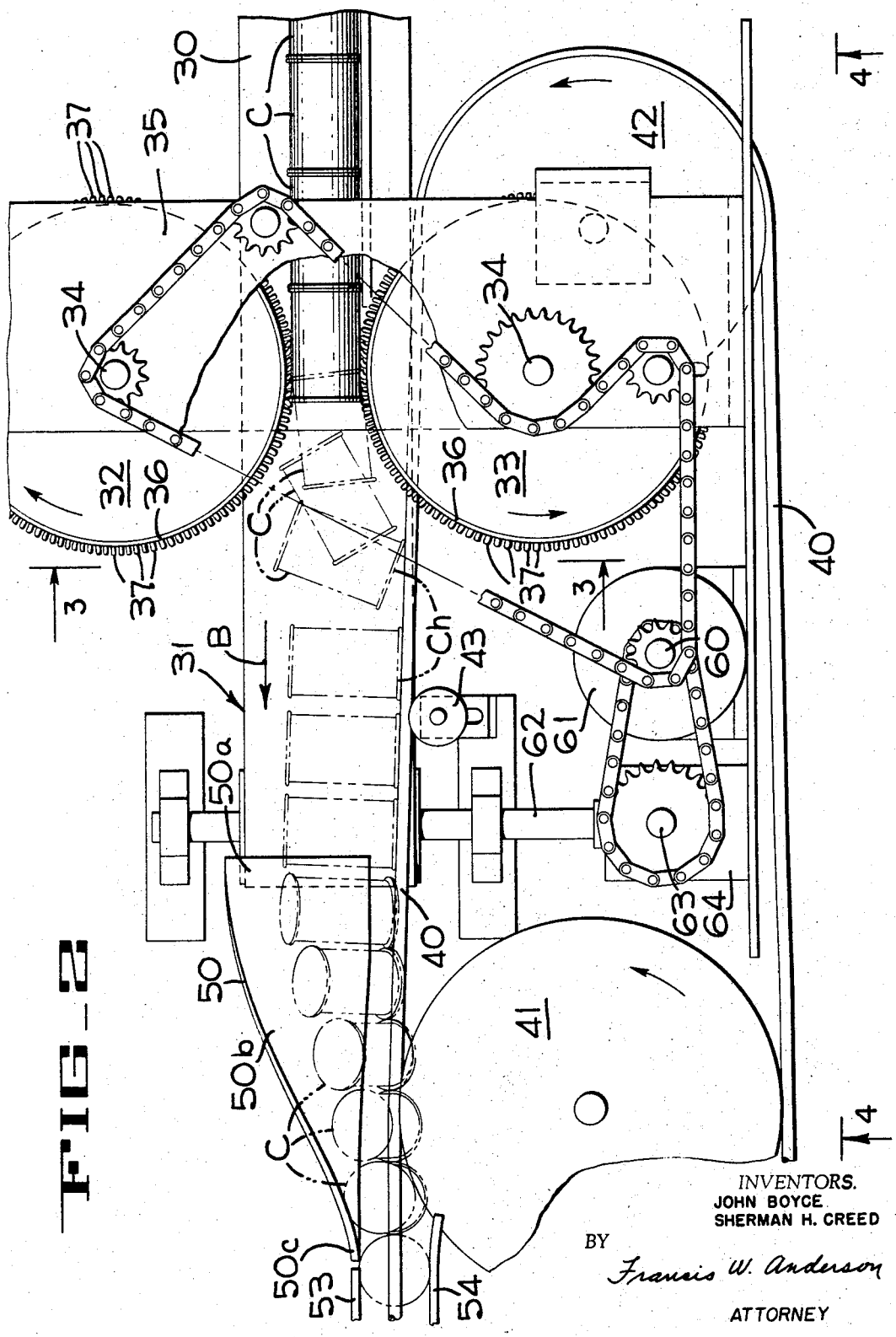

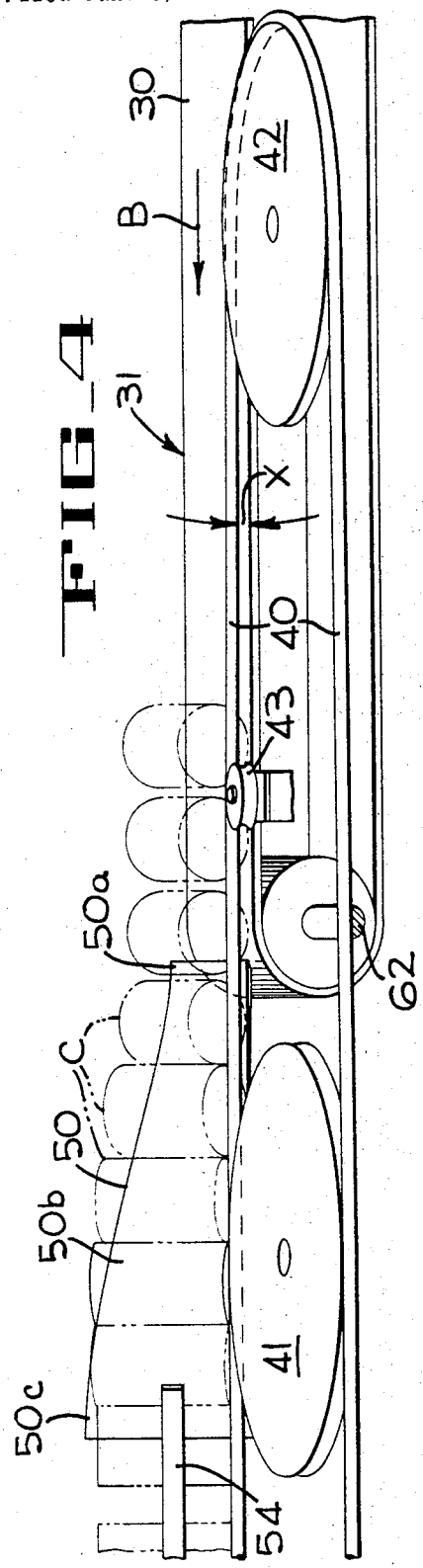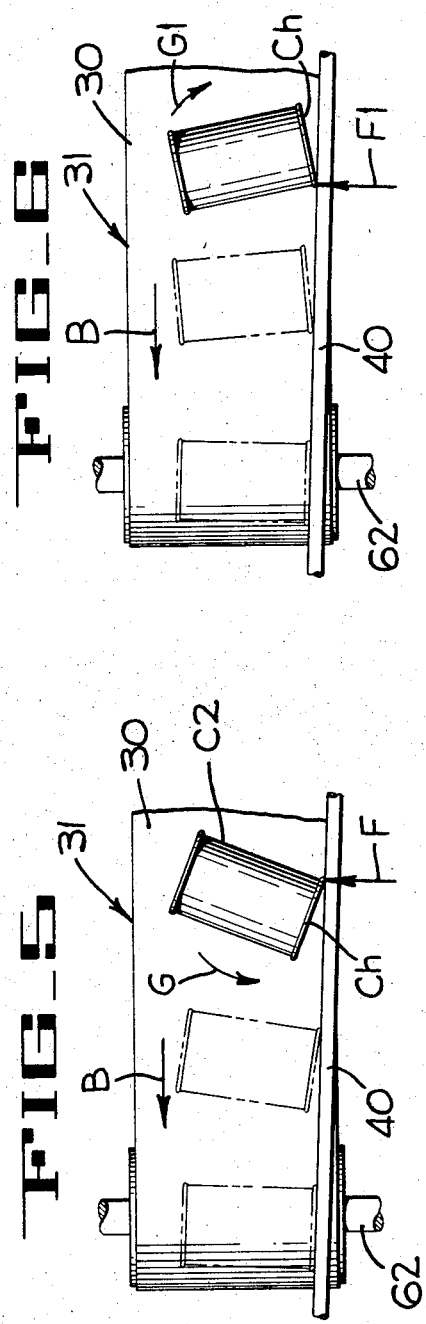

United States Patent Office

3,403,770
Patented Oct. 1, 1968

3,403,770
ARTICLE ORIENTING APPARATUS
John Boyce and Sherman H. Creed, San Jose, Calif., assignors to FMC Corporation, San Jose, Calif., a corporation of Delaware
Filed Jan. 5, 1967, Ser. No. 607,450
8 Claims. (Cl. 198—33)

ABSTRACT OF THE DISCLOSURE

The upper run of an endless conveyor belt carries each article through a turning mechanism that swings the article through approximately 90 degrees. A cable, that travels at substantially the same speed as the belt, is disposed along one edge of the belt to limit and control the completion of the turning movement of the article to stabilize it, and provide support for it.

Background of the invention

In general, this invention is in that field of art concerned with arranging articles on conveyors, and particularly with changing the orientation of the articles from a horizontal to a vertical orientation.

Many devices have been disclosed in prior patents for changing the orientation of articles from a horizontal to a vertical position or vice versa. In the patent to Betge No. 2,525,765, a curved slot is employed for turning cylindrical members from a horizontal to a vertical position. Similarly, in the Christiansen Patent No. 2,439,075, a twisted conduit made up of spaced bars is used to change the orientation of containers. In Jeremiah No. 2,775,334, a chute having a fulcrum built therein is arranged to pivot containers through an angle of 90° from a reclining to an upright position. These mechanisms have been successful for certain types of operations however, it has been found that none of them are thoroughly reliable for controlling the movement of cans at high speeds, such as up to and in excess of 1000 cans per minute.

Summary

In general, the invention concerns an article-orienting mechanism for use with a primary article-turning mechanism which turns articles through approximately 90°, and particularly features a moving support cable against which one side of the article is directed in the final stages of the turning movement, said cable being effective to stabilize the article at that time. The cable is moved forwardly at about the same speed as the forward speed of the article and, accordingly, the cable does not itself cause a further turning of the article such as the turning that occurs when a moving article engages a stationary wall or the like. Accordingly, one variable which tends to cause uncontrolled turning of the article is eliminated, and the only factor that must be taken into consideration in obtaining a controlled turning of the article is the article-turning action of the primary turning mechanism.

It is therefore an object of the present invention to provide an improved mechanism for changing the orientation of articles moving at relatively fast speeds. Another object is the provision of a mechanism for changing the orientation of cylindrical articles, such as metal cans, from a horizontal to a vertical orientation while the articles are moving past a point at the rates up to and in excess of 1000 articles per minute.

Other and further features and objects of the invention will be apparent from the following description taken in connection with the accompanying drawings, in which:

FIGURE 1 is a fragmentary schematic vertical section of a hydrostatic cooker which is adapted to use the can-orienting mechanism of the present invention.

FIGURE 2 is an enlarged fragmentary section taken along line 2—2 of FIG. 1.

FIGURE 3 is a vertical section taken along line 3—3 of FIG. 2.

FIGURE 4 is a vertical section taken along line 4—4 of FIG. 2, portions being broken away.

FIGURES 5 and 6 are fragmentary schematic views showing the article stabilizing action of the mechanisms of the present invention.

In the hydrostatic cooker 10 of FIG. 1, cans are carried into the cooker on the upper run 11 of an endless belt conveyor that has a lower run 12, both runs being movable in directions at right angles to the plane of the paper in FIG. 1. When approximately 20 cans are positioned end-to-end in the cooker, an elongate, flat push-off blade 14, moving in a counterclockwise direction about the axis of a shaft 15, pushes the line of cans into a pocket defined by opposed pocket members 17 of a carrier chain 18 that moves in the direction of arrows A. This chain may be of the type disclosed in United States Letters Patent No. 3,347,351 to Mencacci et al. wherein each pocket member 17 is generally T-shaped in transverse cross-section and adjacent pockets are arranged to swing away from each other as the chain travels around a guide pulley unit 20. As the members 17 swing away from each other, the pocket defined by the members is opened to receive the line of cans pushed laterally from the belt run 11 by the blade 14. As the pocket members 17 move away from the guide pulley unit 20, the pocket closes to confine the line of cans and to carry them through a preheating chamber 25, a steam dome 26, and a chamber 27 in which the cans are cooled. When the line of cans again engages the guide pulley unit 20, the pocket is opened and the line of cans drops onto the upper run 30 of an endless belt 31 (FIG. 2). The belt 31 carries the line of cans in the direction of arrow B out of the cooker through an opening in a side wall and to a position between a pair of can-turning drums 32 and 33, each of which is keyed to a shaft 34 that is supported for rotation in a support member 35. As seen in FIG. 3 the shafts 34 are inclined so that the drums lie in a plane that is inclined about 20° to the horizontal. Each drum is provided with a rubber covering 36 that is bonded to the surface of the drum and is provided with a plurality of rubber fingers 37 which extend radially outwardly from the covering for a distance of about one-half inch and are effective to engage the side walls of the cans as the cans pass between the rollers. Since the drum 32 is traveling at a higher speed than the drum 33, each can C is turned in a counterclockwise direction (FIG. 2). The turning of the can under the control of the primary turning mechanism, consisting of the belt 31 and the drums 32 and 33, continues until a portion of the chime Ch on the leading end of the can comes into contact with a plastic-covered metal cable 40 which is 3/8" in diameter and disposed adjacent the edge of the upper run 30 of the conveyor belt 31. The cable is trained over a plurality of pulleys including a small idler pulley 43 which backs up the cable in the area where the cable receives and supports the cans, a power driven pulley (not shown), and a pair of pulleys 41 and 42 (FIG. 2). Pulley 42 is smaller in diameter than pulley 41 and the pulleys are so located that the cable is inclined inwardly from right to left (FIG. 2) toward the longitudinal centerline of the conveyor belt 31. Referring to FIGS. 3 and 4, it will be noted that, since the plane of the drums 32 and 33 is inclined 20° to the horizontal, and since the centers of the large pulley 41 and of the smaller pulley 42 are at the same elevation, the cable is inclined upwardly from the point of tangency to pulley 42 to the point of tangency with the pulley 41, as indicated by angle X (FIG. 4).

Referring to FIG. 5, it will be seen that when a can

C2, that has been turned approximately 90° by the primary turning drums 32 and 33, engages the cable 40 so that the trailing part of its leading chime C*h* contacts the cable first, the cable imparts a force F to the can which is directed generally toward the centerline of the conveyor belt. The surface of the belt reacts on the chimes of the can and imparts a force that is directed in a generally opposite direction to force F and sets up a couple which causes the can to pivot in the direction of arrow G until the chime C*h* moves into flat, stabilized contact with the cable.

The inclination of the belt 30 contributes to the ease of orientation by throwing the largest portion of the weight of the container and its contents to the lower or outer chime contact point on the belt. This point therefore tends to move with the belt while the inner or upper contact point slides easily. Also added to the orienting couple is a component of the force of gravity.

It should be noted that as the belt inclination increases to the vertical the loads on the belt contact points along with their control effects disappear.

In FIGURE 6 is indicated the stabilizing effect that the moving inclined cable has on a can that has been rotated slightly more than 90° by the primary turning drums. In this instance, the cable 40, imparts a force F1 and the belt imparts a force in an opposite direction to set up a couple that causes the can to pivot in the direction of arrow G1 until the chime C*h* moves into stabilized position on the moving cable.

Of course, if the can has been turned to the point where the chime engages the cable in substantially flat abutting contact, no righting action is necessary.

When a can has been stabilized, it is advanced by the joint carrying action of the belt 30 and the cable 40, which move at substantially the same speed, into contact with a curved or twisted guide wall 50. This wall has a portion 50*a* that is substantially in the plane of the belt 30, a curved transition portion 50*b*, and a vertical portion 50*c*. As the cans are conveyed along by the cable 40, they are progressively righted and moved to a position between two vertical guide bars 53 and 54 and delivered in this vertical position to a subsequent processing unit such as the feed conveyor of a labelling machine.

It will be evident that the inclination of the cable 40 will depend upon the size and weight of the cans being handled, the speed of movement of the belt 30 and the cable 40, and the turning movement imparted to the cans by the primary turning mechanism. In one installation where cans were handled at the rate of approximately 600 cans per minute, the belt 30 and the cable 40 has a linear speed of 200 f.p.m., the drum 32 had a peripheral speed of 524 f.p.m., the drum 33 had a peripheral speed of 328 f.p.m., and the cans, filled with water, measured approximately $2^{11}/_{16}''$ in diameter and about 4 inches in length. The cable 40 was inclined inwardly toward the centerline of the belt 30 and about ½ inch per foot of length, and inclined upwardly relative to the horizontal about ½ inch per foot of length between pulleys 41 and 42.

As will be evident from FIGURE 2, the shafts 34 are chain-driven from the shaft 60 of a motor 61 while the shaft 62 that drives the belt conveyor 31 is driven from a drive shaft 63 of a gear box 64, which shaft is also chain-driven from the motor shaft 61.

From the foregoing description it will be apparent that the present invention provides an efficient mechanism for stabilizing rapidly moving articles as they are being turned during an orienting operation. While the apparatus has been described in connection with the orientation of cylindrical articles such as cans, it is evident that it will be equally effective in orienting and stabilizing articles of configurations other than cylindrical.

Also, while the inclined cable 40 has been disclosed in association with an inclined conveyor 31 and drums 32 and 33, it will be effective for arresting the turning of articles and stabilizing them in an installation where the conveyor 31 and the drums are horizontal. In this case, the angling of the cable inwardly toward the centerline of the belt 31 will be the factor that initiates the forces which causes the article to turn to a desired orientation.

Having thus described the invention, what we claim as new and desire to protect by Letters Patent is:

1. In an article orienting apparatus of the type wherein an article having a first orientation is engaged and swung by a primary turning mechanism including a surface along which the article is conveyed toward a desired oriented position while being advanced at a predetermined speed in a first direction, the improvement which comprises a moving guide member disposed adjacent said turning mechanism in a position to be engaged by a portion of a planar surface of the article immediately following the primary turning of the article while the article is on said conveying surface, and means for moving said guide member at substantially said predetermined speed whereby said member provides a moving guide surface for the article in its turned position, said moving guide member being inclined relative to the direction the article is being advanced whereby the article is partially supported by said guide member and a force is imparted to the article in a direction substantially normal to the direction of movement of said guide member.

2. In an article orienting apparatus of the type wherein articles having a first orientation are advanced in a predetermined direction on a conveyor surface moving at a first speed and are engaged by a turning mechanism and swung toward a second orientation, the improvement which comprises a cable adjacent said turning mechanism and adjacent one edge portion of said conveyor surface in the path of the turning movement of the article to be engaged by the article as it is turned, and means for moving said cable at substantially said first speed and generally in the direction of advance of said conveyor surface, said cable providing a moving surface effective to stop the turning movement of the article and to cooeprate with said conveyor surface to continue the advancing of the article, said cable being angled inwardly toward the longitudinal centerline of said conveyor surface.

3. In an article orienting apparatus of the type wherein articles having a first orientation are advanced in a predetermined direction on a conveyor surface moving at a first speed and are engaged by a turning mechanism and swung toward a second orientation, the improvement which comprises a cable adjacent said turning mechanism and adjacent one edge portion of said conveyor surface in the path of the turning movement of the article to be engaged by the article as it is turned, and means for moving said cable at substantially said first speed and generally in the direction of advance of said conveyor surface, said cable providing a moving surface effective to stop the turning movement of the article and to cooperate with said conveyor surface to continue the advancing of the article, said conveyor surface being inclined relative to the horizontal and said cable being inclined relative to the horizontal to cooperate with said conveyor surface to effect a secondary turning movement of the article to a stable position on the cable.

4. In an article orienting apparatus of the type wherein an article having a first orientation is engaged and swung by a primary turning mechanism including a surface along which the article is conveyed toward a desired oriented position while being advanced at a predetermined speed in a first direction, the improvement which comprises a moving guide member disposed adjacent said turning mechanism in a position to be engaged by a portion of a planar surface of the article immediately following the primary turning of the article while the article is on said conveying surface, and means for moving said guide member at substantially said predetermined speed whereby said member provides a moving guide surface for the article in its turned position, the conveyor surface of the turning mechanism being movable and being inclined at an angle relative to the horizontal, and said moving guide member being disposed near the lowermost edge of said conveying surface to receive the article as it is turned by said turning mechanism and arrest the turning movement of the article.

5. Apparatus according to claim 4 wherein said moving support member is a cable that is directed at an angle inwardly toward the longitudinal centerline of said conveyor surface.

6. An apparatus according to claim 4 wherein said turning mechanism includes a pair of spaced turning drums, means defining a plurality of resilient article gripping fingers secured to and projecting outwardly from the periphery of each drum, and means for driving one of said drums at a higher peripheral speed than the other drum.

7. An apparatus according to claim 6 wherein the articles are reliable turned at the rate of about 600 articles per minute.

8. An apparatus according to claim 7 wherein the articles are elongated containers and wherein the containers are turned between a position wherein the longitudinal axes of the containers are parallel to the direction of movement of the containers and a position wherein the longitudinal axes are perpendicular to the direction of movement of the containers.

References Cited

UNITED STATES PATENTS 1,290,862  1/1919  Adderson  198—162 X

EDWARD A. SROKA, *Primary Examiner.*